US012784236B2

(12) United States Patent
Park et al.

(10) Patent No.: US 12,784,236 B2
(45) Date of Patent: Nov. 3, 2026

(54) METHOD AND APPARATUS FOR PROCESSING VIDEO

(71) Applicant: SAMSUNG ELECTRONICS CO., LTD., Suwon-si (KR)

(72) Inventors: Jaeyeon Park, Suwon-si (KR); Iljun Ahn, Suwon-si (KR); Kwanwoo Park, Suwon-si (KR); Youngchan Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 18/618,665

(22) Filed: Mar. 27, 2024

(65) Prior Publication Data

US 2024/0338831 A1 Oct. 10, 2024

Related U.S. Application Data

(63) Continuation of application No. PCT/KR2024/002801, filed on Mar. 5, 2024.

(30) Foreign Application Priority Data

Apr. 5, 2023 (KR) ........................ 10-2023-0045040
Aug. 28, 2023 (KR) ........................ 10-2023-0113187

(51) Int. Cl.
*G06T 7/246* (2017.01)
*G06T 5/50* (2006.01)
*G06T 5/60* (2024.01)

(52) U.S. Cl.
CPC ................ *G06T 7/246* (2017.01); *G06T 5/50* (2013.01); *G06T 5/60* (2024.01);
(Continued)

(58) Field of Classification Search
CPC .. G06T 7/246; G06T 5/50; G06T 5/60; G06T 2207/10016; G06T 2207/20081;
(Continued)

(56) References Cited

U.S. PATENT DOCUMENTS 11,032,576 B2 6/2021 Kennett et al.
11,282,172 B2 3/2022 Mukherjee et al.
(Continued)

FOREIGN PATENT DOCUMENTS

CN 113159034 A 7/2021
CN 113362230 A 9/2021
(Continued)

OTHER PUBLICATIONS

X. Wang, K. C. K. Chan, K. Yu, C. Dong and C. C. Loy, "EDVR: Video Restoration With Enhanced Deformable Convolutional Networks," 2019 IEEE/CVF Conference on Computer Vision and Pattern Recognition Workshops (CVPRW), Long Beach, CA, USA 2019, pp. 1954-1963 (Year: 2019).*
(Continued)

*Primary Examiner* — Jennifer Mehmood
*Assistant Examiner* — Dustin Bilodeau
(74) *Attorney, Agent, or Firm* — Sughrue Mion, PLLC

(57) ABSTRACT

Provided is a method of processing a video, the method comprising: extracting a first image feature from a first input image included in a scene, extracting a second image feature from a second input image included in the scene, wherein the second input image is a target frame, generating, based on the first image feature and the second image feature, a temporal feature associated with information about a temporal change between the first image feature and the second image feature, and generating an output image based on the temporal feature.

21 Claims, 9 Drawing Sheets

(52) U.S. Cl.
CPC ............... *G06T 2207/10016* (2013.01); *G06T 2207/20081* (2013.01); *G06T 2207/20084* (2013.01)

(58) Field of Classification Search
CPC ... G06T 2207/20084; G06T 3/40; G06T 5/00; G06T 7/11; G06T 7/248; G06V 10/44; G06V 10/52; G06V 10/62; G06V 20/40
USPC .......................................................... 382/156
See application file for complete search history.

(56) References Cited

U.S. PATENT DOCUMENTS

| | | | | |
|---|---|---|---|---|
| 11,527,005 | B2 | 12/2022 | Ren et al. | |
| 2013/0070847 | A1 | 3/2013 | Oami et al. | |
| 2022/0076002 | A1* | 3/2022 | Luo | G06V 40/28 |
| 2022/0156944 | A1 | 5/2022 | Zhang et al. | |
| 2022/0253633 | A1 | 8/2022 | Bertasius et al. | |
| 2022/0261959 | A1 | 8/2022 | Zhang et al. | |
| 2022/0301190 | A1 | 9/2022 | Kwak et al. | |
| 2023/0017072 | A1 | 1/2023 | Arnab et al. | |

FOREIGN PATENT DOCUMENTS

| | | | |
|---|---|---|---|
| CN | 114897726 | A | 8/2022 |
| JP | 2017-191608 | A | 10/2017 |
| KR | 10-2019-0123946 | A | 11/2019 |
| KR | 10-2262832 | B1 | 6/2021 |
| KR | 10-2023-0044830 | A | 4/2023 |

OTHER PUBLICATIONS

International Search Report issued Jun. 4, 2024 by the International Searching Authority in International Application No. PCT/KR2024/002801.

Chan et al., BasicVSR: The Search for Essential Components in Video Super-Resolution and Beyond, CVPR 2021, pp. 4947-4956, 2021.

Zhou et al., “Video super-resolution with non-local alignment network,” IET Image Processing 2021, vol. 15, pp. 1655-1667, 2021.

Chan et al., BasicVSR++: Improving Video Super-Resolution with Enhanced Propagation and Alignment, CVPR 2022, pp. 5972-5981, 2022.

Communication dated Mar. 18, 2026, issued by the European Patent Office in European Application No. 24711109.9.

Communication dated Oct. 17, 2025, issued by the European Patent Office in European Application No. 24711109.9.

Wang Xintao et al: “EDVR: Video Restoration With Enhanced Deformable Convolutional Networks”, CVPR Workshop, vol. 7, Jun. 1, 2019, pp. 1954-1963, (Total page 10) XP093318837.

Hai Wang et al: “STDAN: Deformable Attention Network for Space-Time Video Super-Resolution”, Journal of Latex class files, vol. 14, No. 8, Aug. 2021, (Total 10 pages) XP091271748.

Hung Kwok-Wai et al: “Video Super Resolution via Deep Global-Aware Network”, IEEE Access, vol. 7, 5 Jun. 5, 2019, pp. 1954-1963 (Total 10 pages), XP011731220.

* cited by examiner

METHOD AND APPARATUS FOR PROCESSING VIDEO

CROSS-REFERENCE TO RELATED APPLICATION(S)

This application is a continuation of International Application No. PCT/2024/002801, filed on Mar. 5, 2024, which claims priority to Korean Patent Application No. 10-2023-0045040, filed on Apr. 5, 2023, and Korean Patent Application No. 10-2023-0113187, filed on Aug. 28, 2023, in the Korean Patent Office, the disclosures of which are incorporated by reference herein in their entireties.

BACKGROUND

1. Field

The disclosure relates to a method of processing a video, and an apparatus performing the method.

2. Description of Related Art

Frames included in a video may each have different information due to movement of objects in the video. When reconstructing a video using a plurality of frames (e.g., temporal information), information about movement of objects in the video (e.g., an optical flow, etc.) may be calculated, and then the frames are aligned through an image warping process.

For example, for alignment of frames, techniques such as motion estimation for determining a motion vector that describes transformation to an adjacent frame or motion compensation for transforming the adjacent frame to an input frame may be used.

However, calculating an optical flow may be prone to errors for various reasons such as degraded input frames, a rapid change in luminance, rapid motion of objects, objects obscured by other objects, etc. Furthermore, a large amount of computation may be required to calculate an optical flow and perform image warping depending on a resolution of an input frame. When an error occurs during calculation of an optical flow, noise or artifacts may also be present in a video reconstructed using the optical flow containing the error.

SUMMARY

According to an aspect of the disclosure, a method of processing a video may include extracting a first image feature from a first input image included in a scene; extracting a second image feature from a second input image included in the scene, wherein the second input image is a target frame; generating, based on the first image feature and the second image feature, a temporal feature associated with information about a temporal change between the first image feature and the second image feature; and generating an output image based on the temporal feature, wherein the generating the temporal feature may include: performing a first convolution operation on the first image feature and performing a second convolution operation on the second image feature; generating an offset image feature based on a result of the first convolution operation and a result of the second convolution operation using an offset network configured to learn an amount of movement between pixels in the first image feature and pixels in the second image feature; performing a third convolution operation on the offset image feature; performing a fourth convolution operation on the offset image feature; and generating the temporal feature by performing a first self-attention operation that uses the result of the second convolution operation as a first query, uses a result of the third convolution operation as a first key, and uses a result of the fourth convolution operation as a first value.

According to an aspect of the disclosure, a computer-readable recording medium stores one or more instructions which, when executed by at least one processor of a device for processing a video, may cause the device to extract a first image feature from a first input image included in a scene; extract a second image feature from a second input image, wherein the second input image is included in the scene, and wherein the second input image is a target frame; generate, based on the first image feature and the second image feature, a temporal feature associated with information about a temporal change between the first image feature and the second image feature; and generate an output image based on the temporal feature, wherein to generate the temporal feature, instructions may further cause the device to: perform a first convolution operation on the first image feature and performing a second convolution operation on the second image feature; generate an offset image feature based on a result of the first convolution operation and a result of the second convolution operation using an offset network configured to learn an amount of movement between pixels in the first image feature and pixels in the second image feature; perform a third convolution operation on the offset image feature; perform a fourth convolution operation on the offset image feature; and generate the temporal feature by performing a self-attention operation that uses the result of the second convolution operation as a query, uses a result of the third convolution operation as a key, and uses a result of the fourth convolution operation as a value.

According to an aspect of the disclosure, an apparatus for processing a video includes at least one processor; and a memory configured to store one or more instructions which, when executed by the at least one processor, may cause the apparatus to perform operations including: extracting a first image feature from a first input image included in a scene, extracting a second image feature from a second input image included in the scene, wherein the second input image is a target image, generating, based on the first image feature and the second image feature, a temporal feature associated with information about a temporal change between the first image feature and the second image feature, and generating an output image based on the temporal feature, wherein the generating the temporal feature may include: performing a first convolution operation on the first image feature and performing a second convolution operation on the second image feature; generating an offset image feature, based on a result of the first convolution operation and a result of the second convolution operation using an offset network configured to learn an amount of movement between pixels in the first image feature and pixels in the second image feature; performing a third convolution operation on the offset image feature; performing a fourth convolution operation on the offset image feature; and generating the temporal feature by performing a first self-attention operation that uses the result of the second convolution operation as a first query, uses a result of the third convolution operation as first key, and uses a result of the fourth convolution operation as a first value.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
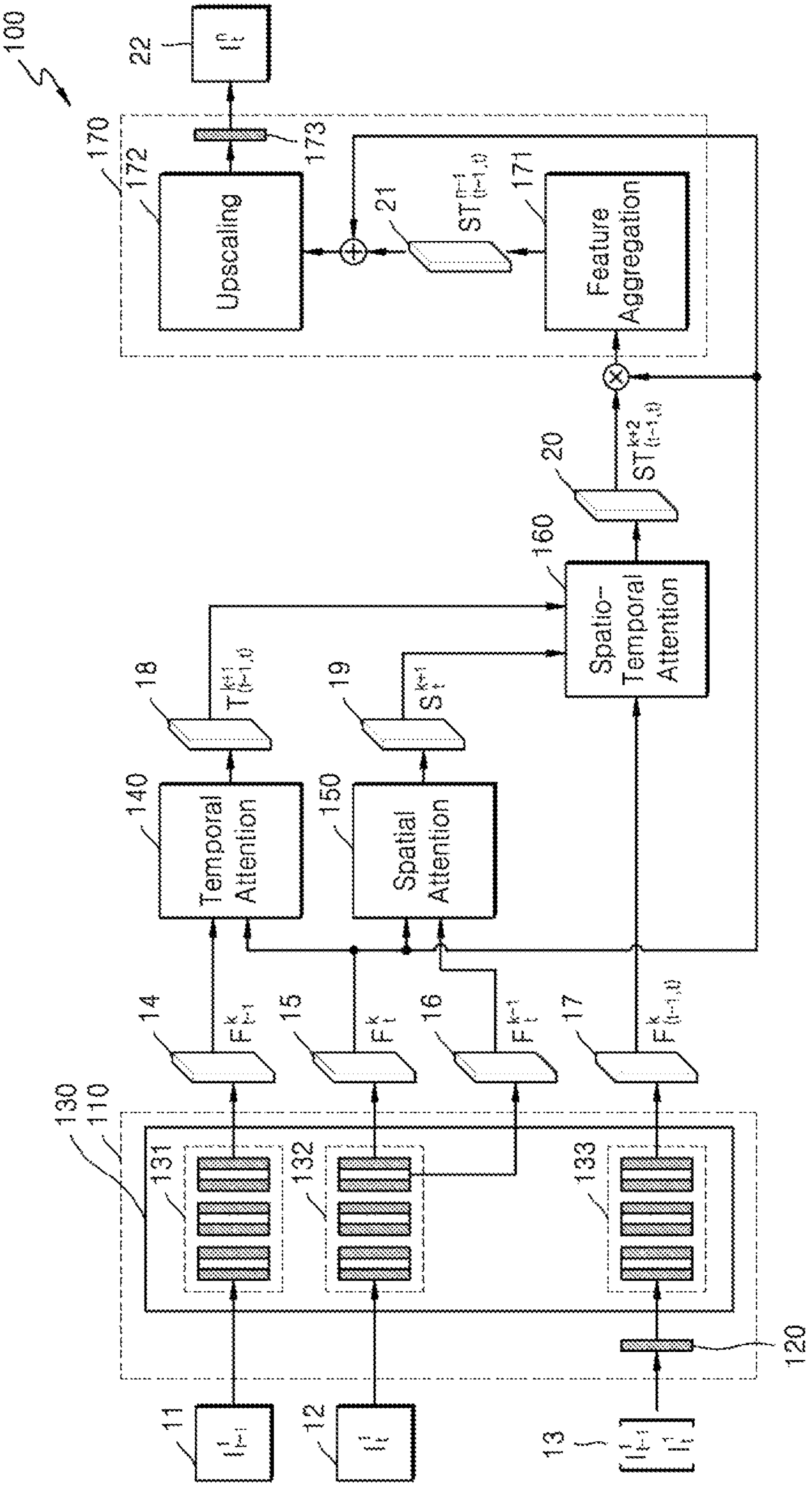
FIG. 1 illustrates an overall structure of a video processing system according to an embodiment of the disclosure.

Throughout the disclosure, the expression "at least one of a, b or c" indicates only a, only b, only c, both a and b, both a and c, both b and c, all of a, b, and c, or variations thereof.

The terms used in the disclosure are general terms currently widely used in the art based on functions described in the disclosure, but may be changed according to an intention of a technician engaged in the art, precedent cases, advent of new technologies, etc. Furthermore, some particular terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Although the terms, such as "first", "second", etc., may be used herein to describe various elements or components, these elements or components should not be limited by the terms. The terms are only used to distinguish one element or component from another element or component. For example, as used herein, a first element or component may be termed a second element or component without departing from the scope of an embodiment of the disclosure, and similarly, a second element or component may be termed a first element or component.

Furthermore, it should be understood that when a component is referred to as being "connected" or "coupled" to another component, the component may be directly connected or coupled to the other component, but may also be connected or coupled to the other component via another intervening component therebetween. On the other hand, when a component is referred to as being "directly connected" or "directly coupled" to another component, it should be understood that there is no other intervening component therebetween.

Singular expressions used herein are intended to include plural expressions as well unless the context clearly indicates otherwise. Terms used herein, including technical or scientific terms, are intended to have the same meaning as commonly understood by one of ordinary skill in the art described herein.

It will be further understood that the terms "comprises" and/or "includes" when used in the disclosure, specify the presence of stated features, numbers, steps, operations, elements, components, or combinations thereof described herein, but do not preclude the presence or addition of one or more other features, numbers, steps, operations, elements, components, or combinations thereof.

Furthermore, in the disclosure, an element expressed as a 'unit,' a 'module,' or the like, may include two or more elements combined into a single element, and a single element may be divided into two or more elements according to subdivided functions. Furthermore, each element to be described below may further perform, in addition to its described functions, some or all of functions performed by another element, and some of the main functions of each element may be performed entirely by another component.

In the disclosure, functions related to artificial intelligence (AI) are performed via a processor and a memory. The processor may be configured as one or a plurality of processors. In this case, the one or plurality of processors may be a general-purpose processor such as a central processing unit (CPU), an application processor (AP), a digital signal processor (DSP), etc., a dedicated graphics processor such as a graphics processing unit (GPU), a vision processing unit (VPU), etc., or a dedicated AI processor such as a neural processing unit (NPU). The one or the plurality of processors control input data to be processed according to predefined operation rules or AI model stored in the memory. In an embodiment, when the one or the plurality of processors is a dedicated AI processor, the dedicated AI processor may be designed with a hardware structure specialized for processing a particular AI model.

The predefined operation rules or AI model may be created using a training process. In this case, the creation using the training process may mean that the predefined operation rules or AI model set to perform desired characteristics (or purposes) are created by training a basic AI model based on a large amount of training data via a learning algorithm. The training process may be performed by an apparatus itself in which AI is performed, or using a separate server and/or system. Examples of a learning algorithm may include, but are not limited to, supervised learning, unsupervised learning, semi-supervised learning, and reinforcement learning.

An AI model may include a plurality of neural network layers. Each of the plurality of neural network layers has a plurality of weight values and may perform neural network computations via calculations between a result of computations in a previous layer and the plurality of weight values. The plurality of weight values assigned to each of the plurality of neural network layers may be optimized by a result of training the AI model. For example, the plurality of weight values may be updated to reduce or minimize a loss or cost value obtained in the AI model during a training process. An artificial neural network may include a deep neural network (DNN), and may be, for example, but is not limited to, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQNs).

A machine-readable storage medium may be provided in the form of a non-transitory storage medium. In this regard, the term 'non-transitory' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer in which data is temporarily stored.

According to an embodiment of the disclosure, methods according to the disclosure may be included in a computer program product when provided. The computer program product may be traded, as a product, between a seller and a buyer. The computer program product may be distributed in the form of a machine-readable storage medium (e.g., compact disc read only memory (CD-ROM)) or distributed (e.g., downloaded or uploaded) on-line via an application store or directly between two user devices (e.g., smartphones). For online distribution, at least a part of the computer program product (e.g., a downloadable app) may be at least transiently stored or temporally generated in the machine-readable storage medium such as memory of a server of a manufacturer, a server of an application store, or a relay server.

Embodiments of the disclosure are described more fully hereinafter with reference to the accompanying drawings so that the embodiments of the disclosure may be more easily implemented by one of ordinary skill in the relevant art. However, embodiments may be implemented in different forms, and the disclosure should not be construed as being limited to embodiments set forth herein.

FIG. 1 illustrates an overall structure of a video processing system 100 according to an embodiment of the disclosure.

According to an embodiment of the disclosure, the video processing system 100 may reconstruct a video using an AI model. For example, reconstruction of a video may include, but is not limited to, frame interpolation that generates and inserts a new frame between existing two frames, denoising that removes noise such as blur, or super-resolution that converts a low-resolution (e.g., 1920×1080) video to a high-resolution (e.g., 3840×2160) video.

According to an embodiment of the disclosure, the video processing system 100 may receive a first input image 11, which may be denoted as $$I_{t-1}^{1},$$

and a second input image 12, which may be denoted as $$I_{t}^{1},$$

and generate an output image 22, which may be denoted as $$I_{t}^{n}.$$

The second input image 12 is a target frame to be reconstructed. The first input image 11 is an adjacent frame included in the same scene as the second input image 12. The output image 22 is an image reconstructed from the second input image 12.

For example, the video processing system 100 may determine whether the first input image 11 and the second input image 12 are included in the same scene based on meta information of the video. The meta information of the video may include at least one of information about a scene to which each frame belongs and information about a frame where a scene change occurs. In another example, the video processing system 100 may determine whether the first input image 11 and the second input image 12 are included in the same scene based on changes in frames of the video.

In the disclosure, a subscript attached to a symbol representing an image or feature indicates the order of frames corresponding to the image or feature. For example, $$I_{t-1}^{1}$$

represents an image corresponding to a t−1-th frame of the video, and $$I_{t}^{1}$$

represents an image corresponding to a t-th frame of the video. In the disclosure, although the operation of the video processing system 100 is described using the t−1-th frame and the t-th frame for convenience of description, the disclosure is not limited thereto, and images input to the video processing system 100 are not necessarily consecutive frames. In other words, when the first input image 11 and the second input image 12 are included in the same scene, the first input image 11 may be a t−2-th frame or t+2-th frame.

In order to reconstruct a video using two input images corresponding to different frames, a correlation between information contained in the two input images (e.g., a type, a location, a movement, etc. of objects in the video) may be used. Refraining from using input images with little correlation may contribute to an improvement of quality of the reconstructed video. According to an embodiment of the disclosure, the video processing system 100 may effectively utilize temporal information by reconstructing a video using input images included in the same scene.

According to an embodiment of the disclosure, the video processing system 100 may include one or more of an input unit 110, a temporal attention module 140, a spatial attention module 150, a spatio-temporal attention module 160, and an output unit 170. However, the components of the video processing system 100 are not limited thereto, and the video processing system 100 may further include other components in addition to those illustrated in FIG. 1, or may not include some of the components illustrated in FIG. 1. For example, the video processing system 100 may be implemented in a form that does not include the spatial attention module 150 and the spatio-temporal attention module 160. In another example, the video processing system 100 may be implemented in a form that does not include the spatio-temporal attention module 160.

In an embodiment of the disclosure, the input unit 110 is a component for extracting an image feature from an input image, and may include an input layer 120 and a feature extraction module 130.

In an embodiment of the disclosure, the feature extraction module 130 may extract a first image feature 14, which may be denoted as $$F_{t-1}^{k},$$

from the first input image 11 using a first CNN 131. The first CNN 131 may include a plurality of convolution layers and a plurality of activation functions. For example, the activation functions of the first CNN 131 may include sigmoid, rectified linear unit (ReLU), leaky ReLU, Gaussian error linear unit (GELU), hyperbolic tangent (tanh), etc., but are not limited thereto.

In an embodiment of the disclosure, the feature extraction module 130 may extract a second image feature 15, which may be denoted as $$F_t^k,$$

from the second input image 12 using a second CNN 132. The second CNN 132 may include a plurality of convolution layers and a plurality of activation functions. For example, the activation functions of the second CNN 132 may include sigmoid, ReLU, leaky ReLU, GELU, tanh, etc., but are not limited thereto.

In an embodiment of the disclosure, the feature extraction module 130 may extract a fourth image feature 17, which may be denoted as $$F_{(t-1,t)}^k,$$

from a third input 13 using the input layer 120 and a third CNN 133. The third input 13 is a matrix of the first input image 11 and the second input image 12 stacked in a channel direction. The input layer 120 may be a two-dimensional (2D) convolution layer. The third CNN 133 may include a plurality of convolution layers and a plurality of activation functions. For example, the activation functions of the third CNN 133 may include sigmoid, ReLU, leaky ReLU, GELU, tanh, etc., but are not limited thereto.

The number of layers included in each of the first CNN 131, the second CNN 132, and the third CNN 133 may be designed by taking into account various factors such as hardware specifications, desired image quality level, etc., but for convenience of description, examples are described herein in which the number of layers included in each CNN is k.

While it has been described above that the feature extraction module 130 includes three CNNs, each CNN performing a separate operation, the disclosure is not limited thereto, and the configuration of the feature extraction module 130 may vary.

For example, the feature extraction module 130 may use a single CNN to extract the first image feature 14 from the first input image 11, the second image feature 15 from the second input image 12, and the fourth image feature 17 from the third input 13. For example, the first to third CNNs 131, 132, and 133 may be included in a single CNN.

In another example, the feature extraction module 130 may extract the first image feature 14 from the first input image 11 and the second image feature 15 from the second input image 12 using one CNN, and extract the fourth image feature 17 from the third input 13 using another CNN. For example, the first CNN 131 and the second CNN 132 may be included in a single CNN.

In the disclosure, a superscript attached to a symbol representing an image or feature indicates the number of layers through which the corresponding image or feature has passed, or a relative position of the image or feature within the video processing system 100. For example, $$F_t^k$$

denotes a feature output from a k-th layer, and $$F_t^{k-1}$$

denotes a feature output from a k−1-th layer.

In an embodiment of the disclosure, when the second CNN 132 includes k layers, a third image feature 16, which may be denoted $$F_t^{k-1},$$

and which is an output of the k−1-th layer, may be used as an input to the spatial attention module 150. Here, the output of the k−1-th layer may mean either an output of a k−1-th convolution layer in the second CNN 132, or an output of an activation function applied after the k−1-th convolution layer. Whether an activation function exists after the k−1-th convolution layer may be determined based on a design intent. The output of the k−1-th layer may be understood as an input for a k-th convolution layer. An operation in which the video processing system 100 reconstructs a video using the third image feature 16 is described below in conjunction with an operation of the spatial attention module 150.

In an embodiment of the disclosure, the temporal attention module 140 may generate, based on the first image feature 14 and the second image feature 15, a temporal feature 18, which may be denoted as $$T_{(t-1,t)}^{k+1},$$

associated with information about a temporal change between the first image feature 14 and the second image feature 15. The temporal attention module 140 may perform an operation based on modified self-attention to generate the temporal feature 18. Examples of the structure and operation of the temporal attention module 140 are described below with reference to FIGS. 2 and 3.

In an embodiment of the disclosure, the spatial attention module 150, may generate a spatial feature 19, which may be denoted as $$S_t^{k+1},$$

for the second input image 12, based on the second image feature 15 and the third image feature 16. The spatial attention module 150 may perform an operation based on modified self-attention to generate the spatial feature 19. An example of the structure and operation of the spatial attention module 150 are described below with reference to FIG. 4.

In an embodiment, the temporal attention module 140 may generate the temporal feature 18 using features extracted from different frames, and the spatial attention module 150 may generate the spatial feature 19 using features extracted from a single frame. In this case, the spatial attention module 150 takes an output of a last layer in the second CNN 132 and an output of a previous layer as an input. In a CNN, a deeper layer may provide a larger receptive field, and features output from each layer may have different pieces of information even when they are generated from the same input. Thus, although the second image feature 15 and the third image feature 16 are both features extracted from the second input image 12, they include different pieces of information, and the spatial attention module 150 may generate the spatial feature 19 by performing a modified self-attention operation based on the second image feature 15 and the third image feature 16.

In an embodiment of the disclosure, the spatio-temporal attention module 160 may generate a spatio-temporal feature 20, which may be denoted as, $$ST_{(t-1,t)}^{k+2},$$

for the first input image 11 and the second input image 12, based on the fourth image feature 17, the temporal feature 18, and the spatial feature 19. The spatio-temporal attention module 160 may perform an operation based on modified self-attention to generate the spatio-temporal feature 20. Examples of the structure and operation of the spatio-temporal attention module 160 are described below with reference to FIG. 5.

In an embodiment of the disclosure, the output unit 170 is a component for generating the output image 22 from the spatio-temporal feature 20, and may include a feature aggregation module 171, an upscaling module 172, and an output layer 173.

In an embodiment of the disclosure, the feature aggregation module 171 may perform a convolution operation on an input obtained by performing matrix multiplication between the spatio-temporal feature 20 and the second image feature 15. The feature aggregation module 171 may include one or more convolution layers and one or more activation functions. For example, the activation function of the feature aggregation module 171 may include sigmoid, ReLU, leaky ReLU, GELU, tanh, etc., but is not limited thereto.

As described above, in an embodiment of the disclosure, the video processing system 100 may be implemented without including the spatial attention module 150 and the spatio-temporal attention module 160. In this case, the feature aggregation module 171 may perform a convolution operation on an input obtained by performing matrix multiplication between the temporal feature 18 and the second image feature 15.

As described above, in an embodiment of the disclosure, the video processing system 100 may be implemented without including the spatio-temporal attention module 160. In this case, the feature aggregation module 171 may perform a convolution operation on an input obtained by performing matrix multiplication between the second image feature 15 and an intermediate feature. The intermediate feature may be obtained by combining the temporal feature 18 and the spatial feature 19 in a channel direction and then passing the result of the combining through a convolution layer for changing the number of channels.

In an embodiment of the disclosure, the upscaling module 172 performs a convolution operation and a pixel shuffle operation on an input that is a sum of a feature 21, which may be denoted as $$ST_{(t-1,t)}^{n-1},$$

output from the feature aggregation module 171 and the second image feature 15. The upscaling module 172 may include one or more convolution layers, one or more activation functions, and one or more pixel shuffle layers. For example, the activation function of the upscaling module 172 may include sigmoid, ReLU, leaky ReLU, GELU, tanh, etc., but is not limited thereto.

In an embodiment of the disclosure, the output unit 170 may generate the output image 22 by performing a convolution operation on an output of the upscaling module 172 using the output layer 173. The output layer 173 may be a 2D convolution layer.

Figure 2:
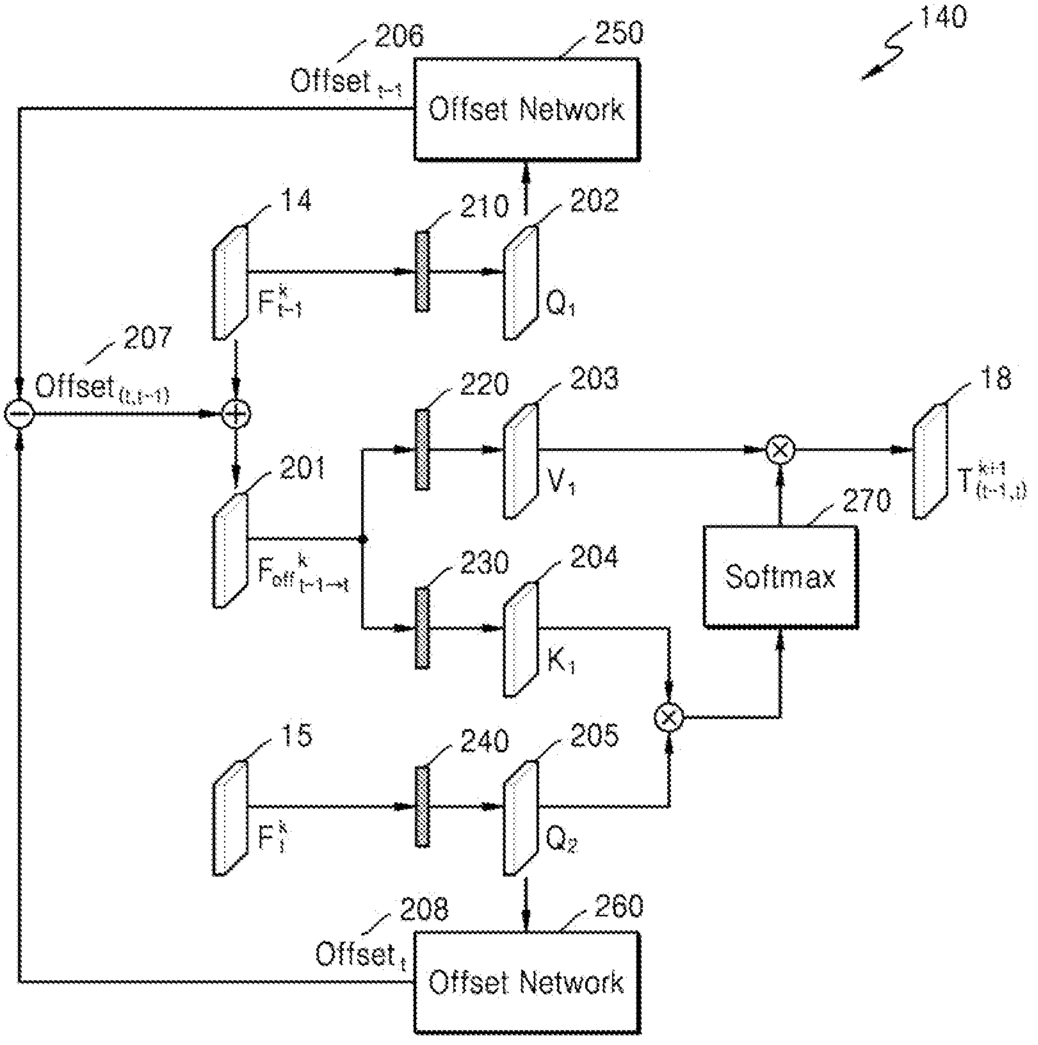
FIG. 2 illustrates a structure of a temporal attention module according to an embodiment of the disclosure.
Figure 3:
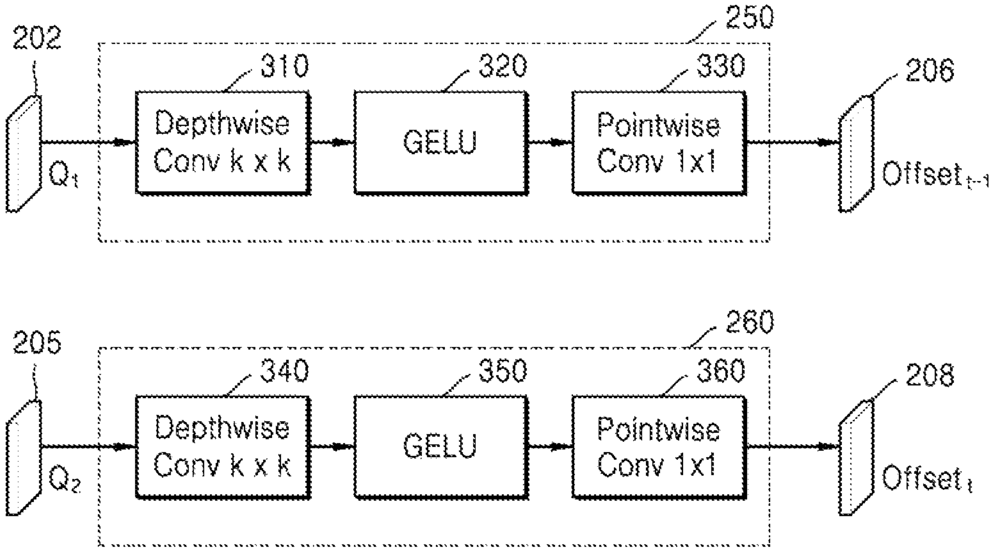
FIG. 3 illustrates a structure of an offset network according to an embodiment of the disclosure.

FIG. 2 illustrates a structure of the temporal attention module 140 according to an embodiment of the disclosure, and FIG. 3 illustrates a structure of first and second offset networks 250 and 260 according to an embodiment of the disclosure.

As described above, in an embodiment of the disclosure, the temporal attention module 140 may generate, based on the first image feature 14 and the second image feature 15, the temporal feature 18 associated with information about a temporal change between the first image feature 14 and the second image feature 15. The temporal attention module 140 may perform an operation based on modified self-attention to generate the temporal feature 18.

Self-attention may be understood as a network or a computational process that generates projected features called query Q, key K, and value V from an input feature, calculates weights by performing matrix multiplication between the query Q and the key K and then applying a softmax function to the result of the matrix multiplication, and calculates a final output by performing matrix multiplication between the weights and the value V. By using self-attention, large weights may be applied to elements that are highly correlated to each element (e.g., pixel) of the input feature, and an output layer placed after the self-attention may focus on the elements with larger weights among a plurality of elements in the input feature. Hereinafter, an operation that involves performing matrix multiplication between a query Q and a key K and then applying a softmax function to the resulting products to calculate weights, and performing matrix multiplication between the weights and a value V is referred to as a "self-attention operation." However, as described below, it should be noted that the video processing system 100 according to an embodiment of the disclosure performs a self-attention operation to process not only time series data (e.g., $$F_{t-1}^{k}$$

and $$F_{t}^{k})$$

but also features extracted from one input image (e.g., $F_t^{k-1}$ and $F_t^k$).

According to an embodiment of the disclosure, by reconstructing a video by generating the temporal feature 18 based on modified self-attention as described below, the video processing system 100 may effectively utilize temporal information to reconstruct the video without the need for a frame alignment process (e.g., optical flow estimation, image warping, etc.) that is error-prone and computationally burdensome.

Referring to FIG. 2, in an embodiment of the disclosure, the temporal attention module 140 may include a convolution operation for generating a first query 202, which may be denoted $Q_1$, for the first image feature 14 using a convolution layer 210.

In an embodiment of the disclosure, the temporal attention module 140 may include a convolution operation for generating a second query 205, which may be denoted $Q_2$, for the second image feature 15 using a convolution layer 240.

In an embodiment of the disclosure, the temporal attention module 140 may include an operation for generating a first offset 206, which may be denoted $Offset_{t-1}$, from the first query 202 using the first offset network 250.

In an embodiment of the disclosure, the temporal attention module 140 may include an operation for generating a second offset 208, which may be denoted $Offset_t$, from the second query 205 using the second offset network 260.

In an embodiment of the disclosure, the temporal attention module 140 may include an operation for generating an image feature 201, which may be denoted $F^k_{off\ t-1\rightarrow t}$, to which an offset is applied by adding, to the first image feature 14, a third offset 207, which may be denoted $Offset_{(t,\ t-1)}$, obtained by subtracting the first offset 206 from the second offset 208. In embodiments, the image feature 201 may be referred to as an offset image feature.

The first offset network 250 and the second offset network 260 are neural networks that learn the amount of movement between pixels in the first image feature 14 and the second image feature 15. For example, when an object moves within a video, a position (e.g., an index) of a pixel corresponding to the object in the first image feature 14 and the second image feature 15 changes. The third offset 207 corresponds to a difference between the first offset 206 associated with the t−1-th frame and the second offset 208 associated with the t-th frame, and includes information about the amount of movement equal to a difference in a position of a pixel between the two frames. For example, the third offset 207 may represent a width and a height corresponding to the amount of movement of a pixel as an x-axis value and a y-axis value, respectively. By adding the third offset 207 to the first image feature 14, the temporal attention module 140 may generate the image feature 201 to which the offset including information about the amount of pixel movement between the two frames is applied.

In an embodiment of the disclosure, the first offset network 250 and the second offset network 260 may each include one or more convolution layers and one or more activation functions. For example, as shown in FIG. 3, the first offset network 250 may include a depthwise convolution layer 310, a GELU activation function 320, and a pointwise convolution layer 330, and the second offset network 260 may include a depthwise convolution layer 340, a GELU activation function 350, and a pointwise convolution layer 360. However, the structures of the first offset network 250 and the second offset network 260 are not limited thereto, and, for example, networks based on various types of convolutions that may reduce the amount of computation, such as convolution, dilated convolution, transposed convolution, separable convolution, depthwise separable convolution, and grouped convolution may be used, and activation functions such as sigmoid, ReLU, leaky ReLU, and tanh may be used.

Although examples provided above relate to a temporal attention module 140 which includes two offset networks, each offset network performing a separate operation, the disclosure is not limited thereto, and the configuration of the temporal attention module 140 may vary. For example, the temporal attention module 140 may include an operation for generating the third offset 207 from the first query 202 and the second query 205 using one offset network. For example, the first and second offset networks 250 and 260 may be included in a single neural network.

Referring back to FIG. 2, in an embodiment of the disclosure, the temporal attention module 140 may include a convolution operation for generating a first value 203, which may be denoted $V_1$, for the image feature 201 to which the offset is applied using a convolution layer 220.

In an embodiment of the disclosure, the temporal attention module 140 may include a convolution operation for generating a first key 204, which may be denoted $K_1$, for the image feature 201 to which the offset is applied using a convolution layer 230.

In an embodiment of the disclosure, the temporal attention module 140 may calculate weights by performing matrix multiplication between the second query 205 and the first key 204 and then applying a softmax function 270 to the result of the matrix multiplication and may generate the temporal feature 18 by performing matrix multiplication between the weights and the first value 203.

As described above, the modified self-attention performed by the temporal attention module 140 is characterized by generating the two queries (e.g., the first query 202 and the second query 205) using the two input features (e.g., the first image feature 14 and the second image feature 15), calculating the offset (e.g., the third offset 207) from the two queries, and generating the key (e.g., the first key 204) and the value (e.g., the first value 203) using the feature (e.g., the image feature 201) to which the offset is applied. In other words, according to an embodiment of the disclosure, the video processing system 100 may effectively utilize temporal information to reconstruct a video without the need for a frame alignment process by considering the amount of movement between pixels in two frames at a feature level rather than at an image level.

Figure 4:
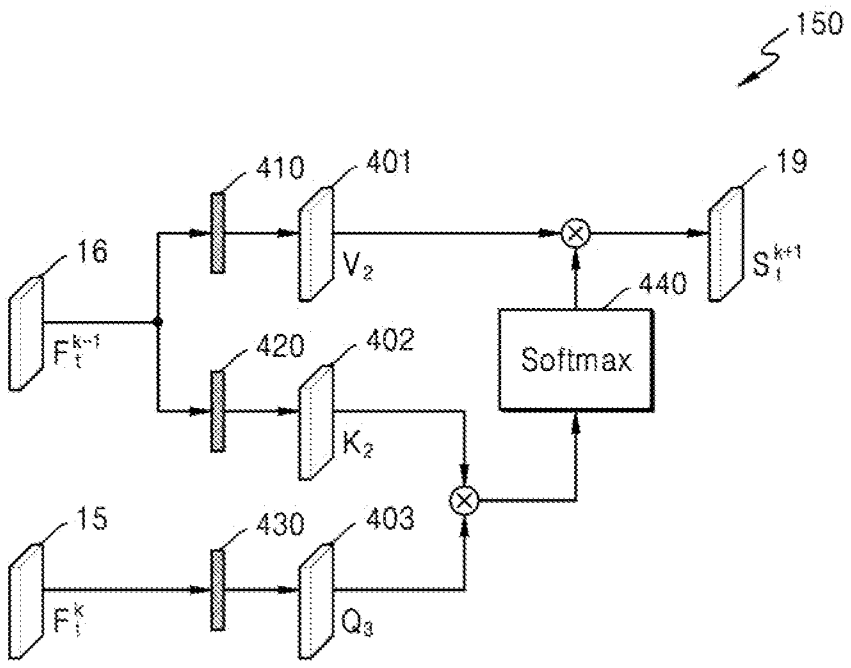
FIG. 4 illustrates a structure of a spatial attention module according to an embodiment of the disclosure.

FIG. 4 illustrates a structure of the spatial attention module 150 according to an embodiment of the disclosure.

As described above, the spatial attention module 150 may generate the spatial feature 19 based on the second image feature 15 and the third image feature 16. The spatial attention module 150 may perform an operation based on modified self-attention to generate the spatial feature 19.

In an embodiment of the disclosure, the spatial attention module 150 may include a convolution operation for generating a second value 401, which may be denoted $V_2$, for the third image feature 16 using a convolution layer 410.

In an embodiment of the disclosure, the spatial attention module 150 may include a convolution operation for generating a second key 402, which may be denoted $K_2$, for the third image feature 16 using a convolution layer 420.

In an embodiment of the disclosure, the spatial attention module 150 may include a convolution operation for generating a third query 403, which may be denoted $Q_3$, for the second image feature 15 using a convolution layer 430.

In an embodiment of the disclosure, the spatial attention module 150 may calculate weights by performing matrix multiplication between the third query 403 and the second key 402 and then applying a softmax function 440 to the result of the matrix multiplication and may generate the spatial feature 19 by performing matrix multiplication between the weights and the second value 401.

The modified self-attention performed by the spatial attention module 150 is characterized by generating the query (e.g., the third query 403) based on the output (e.g., the second image feature 15) of the last layer of the CNN, and generating the key (e.g., the second key 402) and the value (e.g., the second value 401) using the output 16 of the layer preceding the last layer. Accordingly, the video processing system 100 according to an embodiment of the disclosure may effectively utilize spatial information included in an input image by separately applying self-attention in a spatial direction as well as in the temporal direction.

Figure 5:
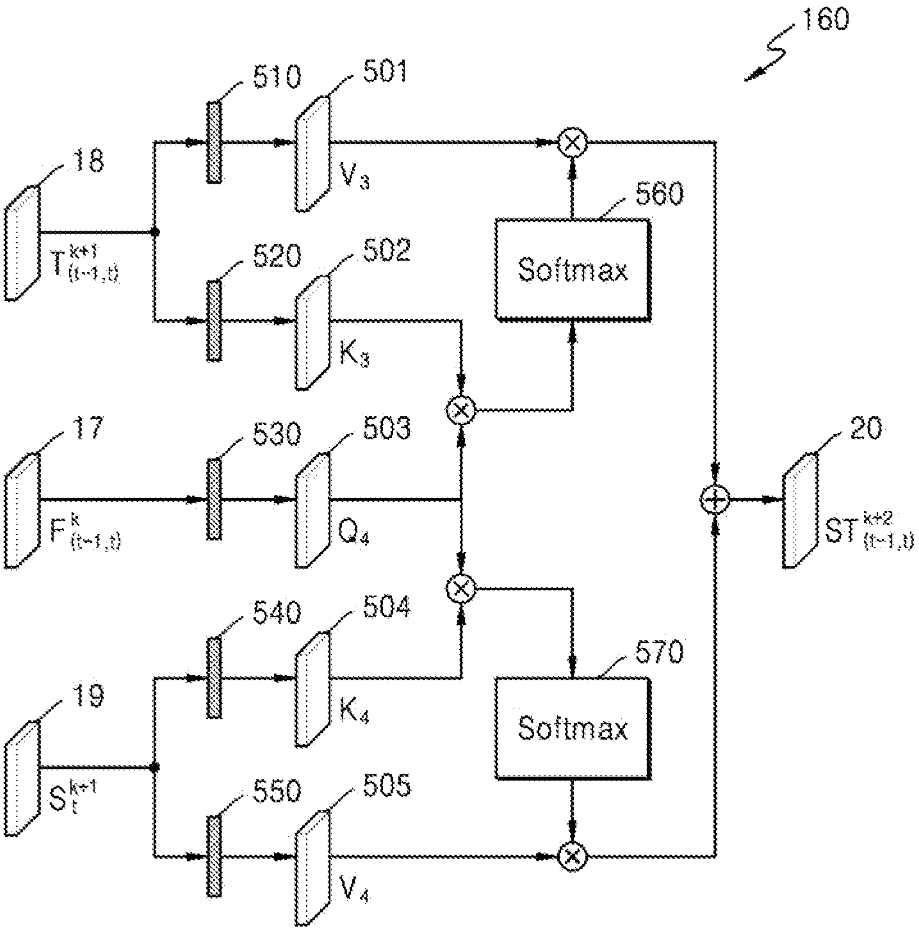
FIG. 5 illustrates a structure of a spatio-temporal attention module according to an embodiment of the disclosure.

FIG. 5 illustrates a structure of the spatio-temporal attention module 160 according to an embodiment of the disclosure.

As described above, the spatio-temporal attention module 160 may generate the spatio-temporal feature 20, based on the fourth image feature 17, the temporal feature 18, and the spatial feature 19. The spatio-temporal attention module 160 may perform an operation based on modified self-attention to generate the spatio-temporal feature 20.

In an embodiment of the disclosure, the spatio-temporal attention module 160 may include a convolution operation for generating a third value 501, which may be denoted $V_3$, for the temporal feature 18 using a convolution layer 510.

In an embodiment of the disclosure, the spatio-temporal attention module 160 may include a convolution operation for generating a third key 502, which may be denoted $K_3$, for the temporal feature 18 using a convolution layer 520.

In an embodiment of the disclosure, the spatio-temporal attention module 160 may include a convolution operation for generating a fourth query 503, which may be denoted $Q_4$, for the fourth image feature 17 using a convolution layer 530.

In an embodiment of the disclosure, the spatio-temporal attention module 160 may include a convolution operation for generating a fourth key 504, which may be denoted $K_4$, for the spatial feature 19 using a convolution layer 540.

In an embodiment of the disclosure, the spatio-temporal attention module 160 may include a convolution operation for generating a fourth value 505, which may be denoted $V_4$, for the spatial feature 19 using a convolution layer 550.

In an embodiment of the disclosure, the spatio-temporal attention module 160 may calculate weights for the temporal feature 18 by performing matrix multiplication between the fourth query 503 and the third key 502 and then applying a softmax function 560 to the result of the matrix multiplication, and may perform matrix multiplication between the weights for the temporal feature 18 and the third value 501. In addition, the spatio-temporal attention module 160 may calculate weights for the spatial feature 19 by performing matrix multiplication between the fourth query 503 and the fourth key 504 and then applying a softmax function 570 to the result of the matrix multiplication, and may perform matrix multiplication between the weights for the spatial feature 19 and the fourth value 505. The spatio-temporal attention module 160 may generate the spatio-temporal feature 20 by adding a result of the matrix multiplication between the weights for the temporal feature 18 and the third value 501 to a result of the matrix multiplication between the weights for the spatial feature 19 and the fourth value 505.

The modified self-attention performed by the spatio-temporal attention module 160 is characterized by generating one query (e.g., the fourth query 503), the two keys (e.g., the second key 502 and the fourth key 504), and the two values (e.g., the third value 501 and the fourth value 505) from the three inputs (e.g., the fourth image feature 17, the temporal feature 18, and the spatial feature 19), and generating the spatio-temporal feature 20 via the two self-attention operations. Accordingly, the video processing system 100 according to an embodiment of the disclosure may process videos by effectively combining temporal information with spatial information.

Figure 6A:
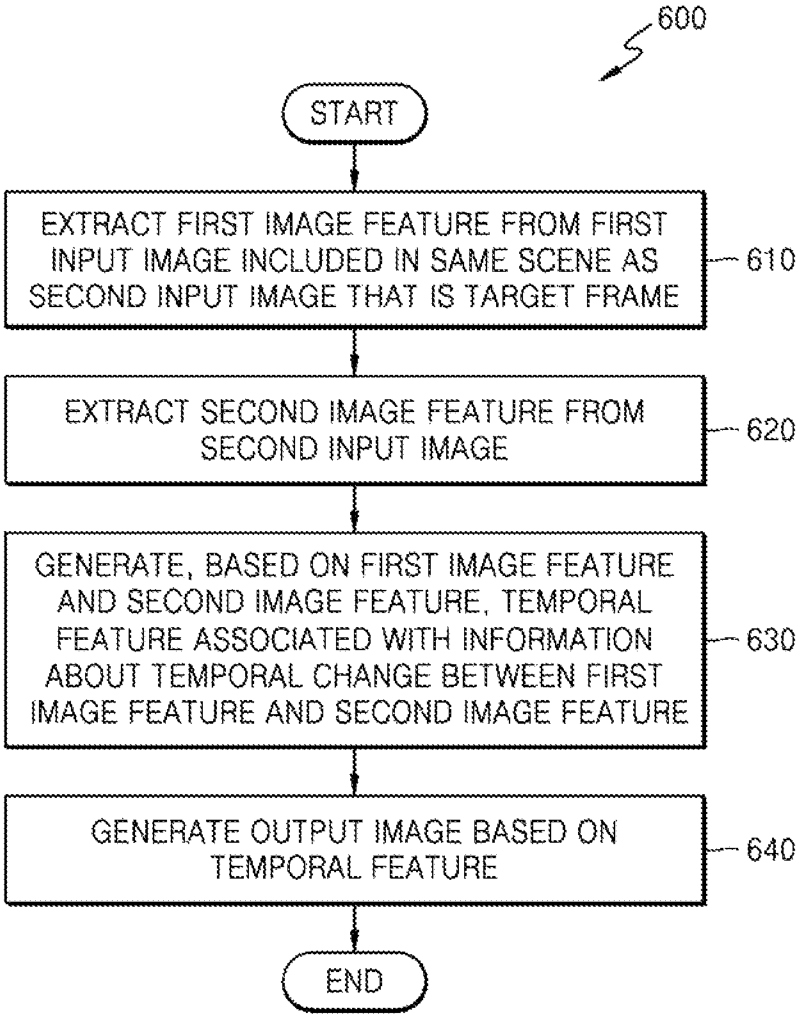
FIG. 6A is a flowchart of a video processing method according to an embodiment of the disclosure.
Figure 6B:
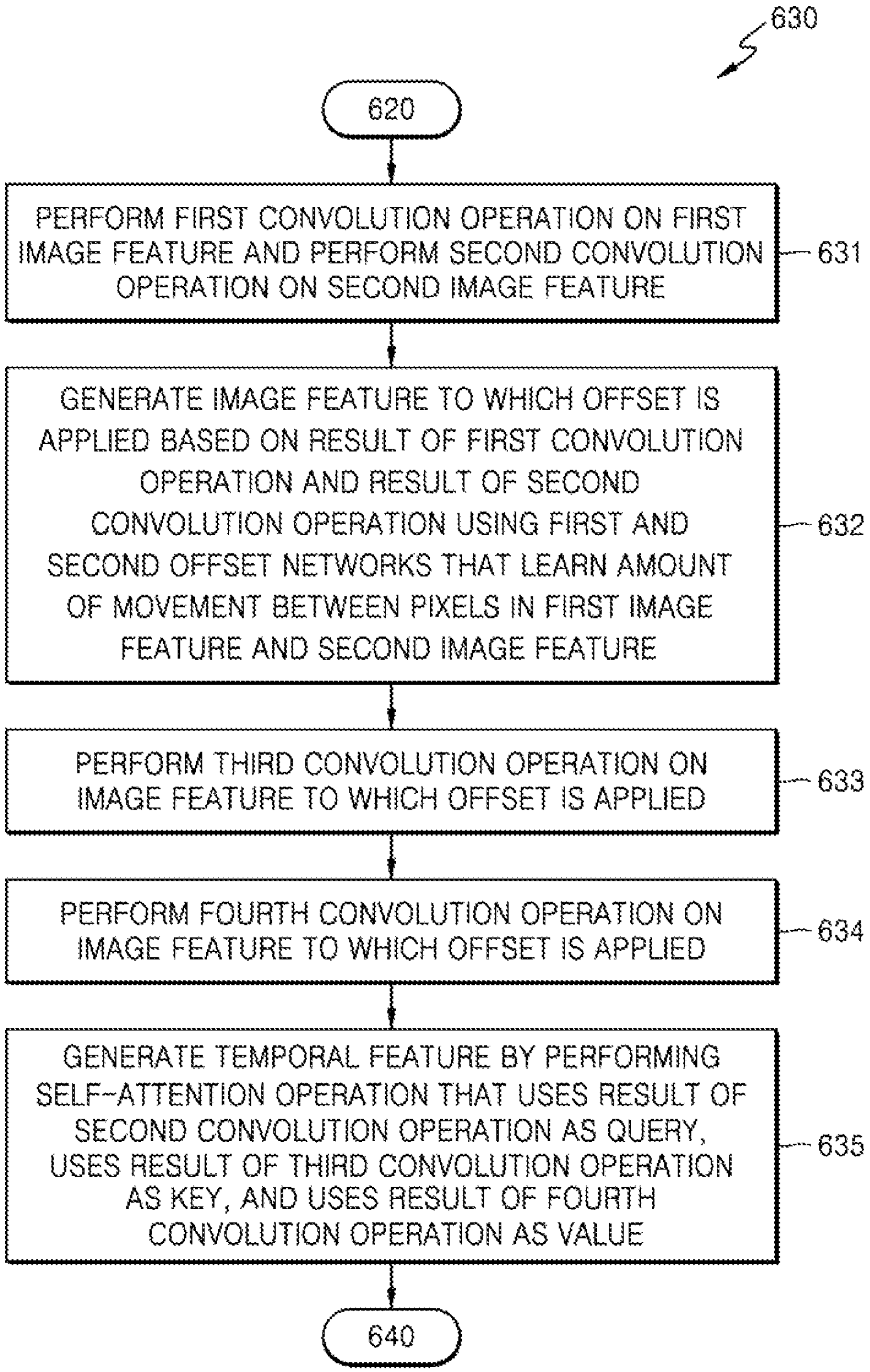
FIG. 6B is a flowchart of a video processing method according to an embodiment of the disclosure.

FIG. 6A is a flowchart of a video processing method 600 according to an embodiment of the disclosure. FIG. 6B is a flowchart of a video processing method 600 according to an embodiment of the disclosure. The video processing method 600 may be performed by a video processing apparatus (e.g., the video processing apparatus 700 described below with reference to FIG. 7, equipped with the video processing system 100.

Referring to FIG. 6A, in operation 610, the first image feature 14 may be extracted from the first input image 11 included in the same scene as the second input image 12, which is a target frame. Operation 610 may correspond to an operation of the feature extraction module 130. In an embodiment of the disclosure, operation 610 may be performed using the first CNN 131.

In operation 620, the second image feature 15 may be extracted from the second input image 12. Operation 620 may correspond to an operation of the feature extraction module 130. In an embodiment of the disclosure, operation 620 may be performed using the second CNN 132.

In operation 630, the temporal feature 18 associated with information about a temporal change between the first image feature 14 and the second image feature 15 may be generated based on the first image feature 14 and the second image feature 15. Operation 630 may correspond to an operation of the temporal attention module 140.

For example, referring to FIG. 6B, in operation 631, a first convolution operation may be performed on the first image feature 14, and a second convolution operation may be performed on the second image feature 15.

In operation 632, the image feature 201 may be generated based on a result of the first convolution operation and a result of the second convolution operation using the first and second offset networks 250 and 260 that learn the amount of movement between pixels in the first image feature 14 and the second image feature 15. In an embodiment of the disclosure, operation 632 may include generating the first offset 206 from the result of the first convolution operation using the first offset network 250, generating the second offset 208 from the result of the second convolution operation using the second offset network 260, and generating the first image feature 14 to which the offset is applied by adding the first image feature 14 to a third offset 207 obtained by subtracting the first offset 206 from the second offset 208. In an embodiment of the disclosure, the first offset network 250 may include the depthwise convolution layer 310, the GELU activation function 320, and the pointwise convolution layer 330, and the second offset network 260 may include the depthwise convolution layer 340, the GELU activation function 350, and the pointwise convolution layer 360.

In operation 633, a third convolution operation may be performed on the image feature 201 to which the offset is applied.

In operation 634, a fourth convolution operation may be performed on the image feature 201 to which the offset is applied.

In operation 635, the temporal feature 18 may be generated by performing a self-attention operation that uses the result of the second convolution operation as a query, uses a result of the third convolution operation as a key, and uses a result of the fourth convolution operation as a value.

Referring again to FIG. 6A, in operation 640, the output image 22 may be generated based on the temporal feature 18. Operation 640 may correspond to an operation of the output unit 170.

In an embodiment of the disclosure, the video processing method 600 may further include an operation of generating the spatial feature 19 for the second input image 12, based on the second image feature 15 and the third image feature 16. In this case, the third image feature 16 is the output of the k−1-th layer in the second CNN 132, and k is the number of layers included in the second CNN 132. In an embodiment of the disclosure, the operation of generating the spatial feature 19 may include performing a fifth convolution operation on the second image feature 15; performing a sixth convolution operation on the third image feature 16; performing a seventh convolution operation on the third image feature 16; and generating the spatial feature 19 by performing a self-attention operation that uses a result of the fifth convolution operation as a query, a result of the sixth convolution operation as a key, and a result of the seventh convolution operation as a value.

In an embodiment of the disclosure, in operation 640, the output image 22 may be generated further based on the spatial feature 19.

In an embodiment of the disclosure, the video processing method 600 may further include an operation of extracting the fourth image feature 17 from the third input 13 that is a matrix of the first input image 11 and the second input image 12 stacked in the channel direction, and an operation of generating the spatio-temporal feature 20 for the first input image 11 and the second input image 12, based on the fourth image feature 17, the temporal feature 18, and the spatial feature 19.

In an embodiment of the disclosure, in operation 640, the output image 22 may be generated further based on the spatio-temporal feature 20.

In an embodiment of the disclosure, the operation of generating the spatio-temporal feature 20 may include performing an eighth convolution operation on the fourth image feature 17; performing a ninth convolution operation on the temporal feature 18; performing a tenth convolution operation on the temporal feature 18; performing an eleventh convolution operation on the spatial feature 19; performing a twelfth convolution operation on the spatial feature 19; generating a first intermediate result by performing a self-attention operation that uses a result of the eighth convolution operation as a query, uses a result of the ninth convolution operation as a key, and uses a result of the tenth convolution operation as a value; generating a second intermediate result by performing a self-attention operation that respectively uses the result of the eighth convolution operation as a query, uses a result of the eleventh convolution operation as a key, and uses a result of the twelfth convolution operation as a value; and generating the spatio-temporal feature 20 by adding the first intermediate result to the second intermediate result.

Figure 7:
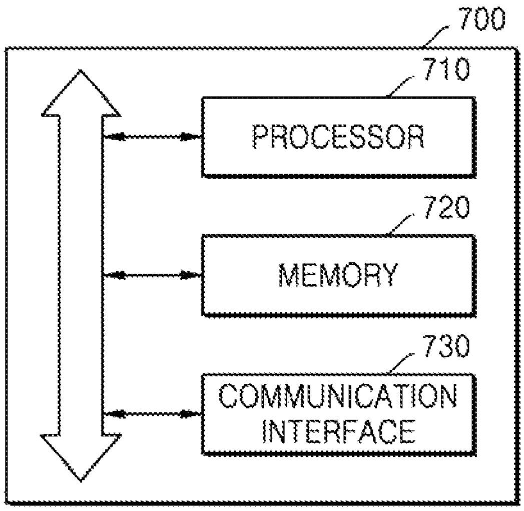
FIG. 7 is a block diagram of a video processing apparatus according to an embodiment of the disclosure.

FIG. 7 is a block diagram of the video processing apparatus 700 according to an embodiment of the disclosure.

The video processing apparatus 700 shown in FIG. 7 may process videos by performing the operations of the video processing system 100 described above. A video to be processed may be at least one of a video stored in the video processing apparatus 700, and a video received by the video processing apparatus 700 from an external device (e.g., a server of an over-the-top (OTT) service provider that provides a video over the Internet, etc.).

In an embodiment of the disclosure, the video processing apparatus 700 may include one or more of a processor 710, a memory 720, and a communication interface 730. However, the components of the video processing apparatus 700 are not limited thereto and may include more components than those shown in FIG. 7, or may not include some of the components shown in FIG. 7. For example, the video processing apparatus 700 may be, or may include, a television (TV) or a mobile device (e.g., a smartphone, a smartwatch, a tablet PC, etc.) that further includes a display for displaying a video or an interface for receiving a user input. For another example, the video processing apparatus 700 may be, or may include, a graphics card that is included in a PC (e.g., a desktop, a laptop, etc.) and processes videos stored in a storage (e.g., a solid state drive (SSD), a hard disk drive (HDD), etc.) of the PC or videos received over the Internet. In an embodiment of the disclosure, some or all of the processor 710, memory 720, and communication interface 730 may be implemented in the form of a single chip, and the processor 710 may include one or more processors.

In an embodiment of the disclosure, the processor 710 is a component that controls a series of processes to cause the video processing apparatus 700 to operate, and may be configured as one or a plurality of processors. In this case, the one or plurality of processors may be a general-purpose processor such as a CPU, an AP, a DSP, etc., a dedicated graphics processor such as a GPU, a VPU, etc., or a dedicated AI processor such as an NPU. For example, when the one or the plurality of processors is a dedicated AI processor, the dedicated AI processor may be designed with a hardware structure specialized for processing a particular AI model.

In an embodiment of the disclosure, the processor 710 may write data to the memory 720 or read data stored in the memory 720, and in particular, execute a program stored in the memory 720 to process data according to predefined operation rules or AI models. Accordingly, the processor 710 may perform the operations of the video processing system 100 described above.

In an embodiment of the disclosure, the memory 720 is a component for storing various programs or data, and may include storage media, such as read-only memory (ROM), random access memory (RAM), hard disks, compact disc ROM (CD-ROM), and digital versatile discs (DVDs), or a combination of the storage media. The memory 720 may not exist separately, but may be configured to be included in the processor 710. The memory 720 may consist of volatile memory, non-volatile memory, or a combination of volatile memory and non-volatile memory. The memory 720 may store a program for performing the operations of the video processing system 100 described above. The memory 720 may provide stored data to the processor 710 according to a request from the processor 710.

In an embodiment of the disclosure, the communication interface 730 is a component for transmitting and receiving signals (e.g., control commands, data, etc.) to and from an external device in a wired or wireless manner, and may be configured to include a communication chipset that supports various communication protocols. The communication interface 730 may receive a signal from the outside and output it to the processor 710, or may transmit a signal output from the processor 710 to the outside. For example, when the video processing apparatus 700 is a television or a mobile device, the communication interface 730 may be a module capable of receiving a video over the Internet. As another example, when the video processing apparatus 700 is a graphics card, the communication interface 730 may be an interface (e.g., Industry Standard Architecture (ISA) bus, VESA Local Bus, NuBus, peripheral component interconnect bus (PCI) bus, PCI Express (PCIE), etc.) capable of exchanging signals with a CPU, RAM, or storage via a mainboard. According to an embodiment of the disclosure, the communication interface 730 may receive a video from an external device.

Figure 8:
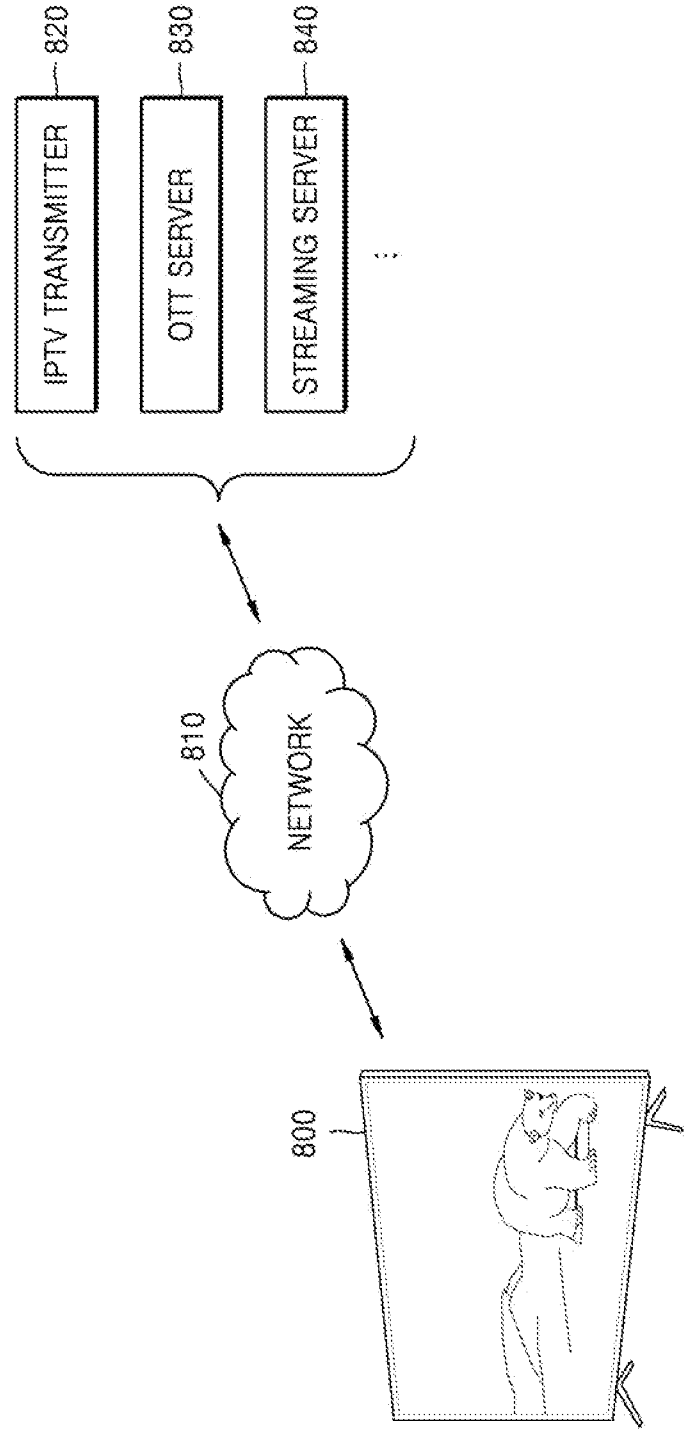
FIG. 8 illustrates an example in which a video processing system is applied to a television, according to an embodiment of the disclosure.

FIG. 8 illustrates an example in which the video processing system 100 is applied to a television 800, according to an embodiment of the disclosure. For example, the television 800 may correspond to the video processing apparatus 700. In another example, the television 800 may include dedicated hardware (e.g., a chip) for driving the video processing system 100, and in this case, the dedicated hardware may correspond to the video processing apparatus 700.

Referring to FIG. 8, the television 800 may receive videos from various external devices via a network 810. For example, the external devices may include various types of devices capable of providing videos to the television 800 over the network 810, such as an Internet Protocol television (IPTV) transmitter 820 managed by an IPTV broadcast provider, an OTT server 830 of an OTT service provider, and a streaming server 840 of a video streaming service provider.

In an embodiment, external devices may store or transmit videos in a compressed state for various reasons such as network transmission speed, network usage costs, and server maintenance costs. In an embodiment, even when an external device transmits a high-quality video to the television 800, the television 800 may receive a low-quality video due to losses during transmission. The television 800 that has received a low-quality video for various reasons may use the video processing system 100 to improve the quality of the video and then play the video. As described above, the video processing system 100 may separately extracting temporal information and spatial information from a video and then effectively combine them together, thereby improving the quality of the video in real time without the need for a frame alignment process and enhancing the experience of the user of the television 800.

According to an aspect of the disclosure, a method of processing a video may include extracting a first image feature from a first input image included in a scene; extracting a second image feature from a second input image included in the scene, wherein the second input image is a target frame; generating, based on the first image feature and the second image feature, a temporal feature associated with information about a temporal change between the first image feature and the second image feature; and generating an output image based on the temporal feature, wherein the generating the temporal feature may include: performing a first convolution operation on the first image feature and performing a second convolution operation on the second image feature; generating an offset image feature based on a result of the first convolution operation and a result of the second convolution operation using an offset network configured to learn an amount of movement between pixels in the first image feature and pixels in the second image feature; performing a third convolution operation on the offset image feature; performing a fourth convolution operation on the offset image feature; and generating the temporal feature by performing a first self-attention operation that uses the result of the second convolution operation as a first query, uses a result of the third convolution operation as a first key, and uses a result of the fourth convolution operation as a first value.

In an embodiment, the generating the offset image feature may include: generating a first offset from the result of the first convolution operation using a first offset network; generating a second offset from the result of the second convolution operation using a second offset network; and generating the offset image feature by adding, to the first image feature, a third offset obtained by subtracting the first offset from the second offset.

In an embodiment, the offset network may include: a depthwise convolution layer; a Gaussian error linear unit (GELU) activation function; and a pointwise convolution layer.

In an embodiment, the first image feature may be extracted using a first convolution layer, and the second image feature may be extracted using a second convolution layer.

In an embodiment, the method may further include generating a spatial feature for the second input image based on the second image feature and a third image feature, wherein the output image is generated further based on the spatial feature, and wherein the third image feature is an output of a k−1-th layer in a second convolutional neural network, where k denotes a number of layers included in the second convolutional neural network.

In an embodiment, the generating the spatial feature may include: performing a fifth convolution operation on the second image feature; performing a sixth convolution operation on the third image feature; performing a seventh convolution operation on the third image feature; and generating the spatial feature by performing a second self-attention operation that uses a result of the fifth convolution operation as a second query, uses a result of the sixth convolution operation as a second key, and uses a result of the seventh convolution operation as a second value.

In an embodiment, the method may further include extracting a fourth image feature from a matrix including the first input image and the second input image stacked in a channel direction; and generating a spatio-temporal feature for the first input image and the second input image based on the fourth image feature, the temporal feature, and the spatial feature, wherein the output image is generated further based on the spatio-temporal feature.

In an embodiment, the generating the spatio-temporal feature may include: performing an eighth convolution operation on the fourth image feature; performing a ninth convolution operation on the temporal feature; performing a tenth convolution operation on the temporal feature; performing an eleventh convolution operation on the spatial feature; performing a twelfth convolution operation on the spatial feature; generating a first intermediate result by performing a third self-attention operation that uses a result of the eighth convolution operation as a third query, uses a result of the ninth convolution operation as a third key, and uses a result of the tenth convolution operation as a third value; generating a second intermediate result by performing a fourth self-attention operation that uses the result of the eighth convolution operation as a fourth query, uses a result of the eleventh convolution operation as a fourth key, and uses a result of the twelfth convolution operation as a fourth value; and generating the spatio-temporal feature by adding the first intermediate result to the second intermediate result.

In an embodiment, the method may further include determining whether the first input image and the second input image are included in the scene based on at least one from among meta information about the video and a change in a frame of the video.

According to an aspect of the disclosure, a computer-readable recording medium stores one or more instructions which, when executed by at least one processor of a device for processing a video, may cause the device to extract a first image feature from a first input image included in a scene; extract a second image feature from a second input image, wherein the second input image is included in the scene, and wherein the second input image is a target frame; generate, based on the first image feature and the second image feature, a temporal feature associated with information about a temporal change between the first image feature and the second image feature; and generate an output image based on the temporal feature, wherein to generate the temporal feature, instructions further cause the device to: perform a first convolution operation on the first image feature and performing a second convolution operation on the second image feature; generate an offset image feature based on a result of the first convolution operation and a result of the second convolution operation using an offset network configured to learn an amount of movement between pixels in the first image feature and pixels in the second image feature; perform a third convolution operation on the offset image feature; perform a fourth convolution operation on the offset image feature; and generate the temporal feature by performing a self-attention operation that uses the result of the second convolution operation as a query, uses a result of the third convolution operation as a key, and uses a result of the fourth convolution operation as a value.

According to an aspect of the disclosure, an apparatus 700 for processing a video includes at least one processor 710; and a memory 720 configured to store one or more instructions which, when executed by the at least one processor 710, may cause the apparatus 700 to perform operations including: extracting a first image feature from a first input image included in a scene, extracting a second image feature from a second input image included in the scene, wherein the second input image is a target image, generating, based on the first image feature and the second image feature, a temporal feature associated with information about a temporal change between the first image feature and the second image feature, and generating an output image based on the temporal feature, wherein the generating the temporal feature may include: performing a first convolution operation on the first image feature and performing a second convolution operation on the second image feature; generating an offset image feature, based on a result of the first convolution operation and a result of the second convolution operation using an offset network configured to learn an amount of movement between pixels in the first image feature and pixels in the second image feature; performing a third convolution operation on the offset image feature; performing a fourth convolution operation on the offset image feature; and generating the temporal feature by performing a first self-attention operation that uses the result of the second convolution operation as a first query, uses a result of the third convolution operation as first key, and uses a result of the fourth convolution operation as a first value.

In an embodiment, the generating the offset image feature may include: generating a first offset from the result of the first convolution operation by using a first offset network; generating a second offset from the result of the second convolution operation by using a second offset network; and generating the offset image feature by adding, to the first image feature, a third offset obtained by subtracting the first offset from the second offset to the first image feature.

In an embodiment, the offset network may include: a depthwise convolution layer, a Gaussian error linear unit (GELU) activation function, and a pointwise convolution layer.

In an embodiment, the first image feature may be extracted using a first convolution layer, and the second image feature may be extracted using a second convolution layer.

In an embodiment, the operations may further include generating a spatial feature for the second input image, based on the second image feature and a third image feature, wherein the output image is generated further based on the spatial feature, and wherein the third image feature is an output of a k−1-th layer in a second convolutional neural network, where k denotes a number of layers included in the second convolutional neural network.

In an embodiment, the generating the spatial feature may include: performing a fifth convolution operation on the second image feature, performing a sixth convolution operation on the third image feature, performing a seventh convolution operation on the third image feature, and generating the spatial feature by performing a second self-attention operation that uses a result of the fifth convolution operation as a second query, uses a result of the sixth convolution operation as a second key, and uses a result of the seventh convolution operation as a second value.

In an embodiment, the operations may further include: extracting a fourth image feature from a matrix including the first input image and the second input image stacked in a channel direction; and generating a spatio-temporal feature for the first input image and the second input image, based on the fourth image feature, the temporal feature, and the spatial feature, wherein the output image is generated further based on the spatio-temporal feature.

In an embodiment, the generating the spatio-temporal feature may include: performing an eighth convolution operation on the fourth image feature, performing a ninth convolution operation on the temporal feature, performing a tenth convolution operation on the temporal feature, performing an eleventh convolution operation on the spatial feature, performing a twelfth convolution operation on the spatial feature, generating a first intermediate result by performing a third self-attention operation that uses a result of the eighth convolution operation as a third query, uses a result of the ninth convolution operation as a third key, and uses a result of the tenth convolution operation as a third value, generating a second intermediate result by performing a fourth self-attention operation that uses the result of the eighth convolution operation as a fourth query, uses a result of the eleventh convolution operation as a fourth key, and a uses result of the twelfth convolution operation as a fourth value, and generating the spatio-temporal feature by adding the first intermediate result to the second intermediate result.

In an embodiment, the operations may further include determining whether the first input image and the second input image are included in the scene, based on at least one from among meta information about the video and a change in a frame of the video.

What is claimed is:

1. A method of processing a video, the method comprising:

extracting a first image feature from a first input image included in a scene;

extracting a second image feature from a second input image included in the scene, wherein the second input image is a target frame;

generating, based on the first image feature and the second image feature, a temporal feature associated with information about a temporal change between the first image feature and the second image feature; and generating an output image based on the temporal feature, wherein the generating the temporal feature comprises:

performing a first convolution operation on the first image feature and performing a second convolution operation on the second image feature;

generating an offset image feature based on a result of the first convolution operation and a result of the second convolution operation using an offset network configured to learn an amount of movement between pixels in the first image feature and pixels in the second image feature;

performing a third convolution operation on the offset image feature;

performing a fourth convolution operation on the offset image feature; and generating the temporal feature by performing a first self-attention operation that uses the result of the second convolution operation as a first self-attention query, uses a result of the third convolution operation as a first self-attention key, and uses a result of the fourth convolution operation as a first self-attention value.

2. The method of claim 1, wherein the generating the offset image feature comprises:

generating a first offset from the result of the first convolution operation using a first offset network;

generating a second offset from the result of the second convolution operation using a second offset network; and generating the offset image feature by adding, to the first image feature, a third offset obtained by subtracting the first offset from the second offset.

3. The method of claim 2, wherein the offset network comprises:

a depthwise convolution layer;

a Gaussian error linear unit (GELU) activation function; and a pointwise convolution layer.

4. The method of claim 1, wherein the extracting of the first image feature comprises extracting the first image feature using a first convolution layer, and wherein the extracting of the second image feature comprises extracting the second image feature using a second convolution layer.

5. The method of claim 1, further comprising generating a spatial feature for the second input image based on the second image feature and a third image feature, wherein the output image is generated further based on the spatial feature, and wherein the third image feature is an output of a k−1-th layer in a second convolutional neural network, where k denotes a number of layers included in the second convolutional neural network.

6. The method of claim 5, wherein the generating the spatial feature comprises:

performing a fifth convolution operation on the second image feature;

performing a sixth convolution operation on the third image feature;

performing a seventh convolution operation on the third image feature; and generating the spatial feature by performing a second self-attention operation that uses a result of the fifth convolution operation as a second self-attention query, uses a result of the sixth convolution operation as a second self-attention key, and uses a result of the seventh convolution operation as a second self-attention value.

7. The method of claim 6, further comprising:

extracting a fourth image feature from a matrix comprising the first input image and the second input image stacked in a channel direction; and generating a spatio-temporal feature for the first input image and the second input image based on the fourth image feature, the temporal feature, and the spatial feature, wherein the output image is generated further based on the spatio-temporal feature.

8. The method of claim 7, wherein the generating the spatio-temporal feature comprises:

performing an eighth convolution operation on the fourth image feature;

performing a ninth convolution operation on the temporal feature;

performing a tenth convolution operation on the temporal feature;

performing an eleventh convolution operation on the spatial feature;

performing a twelfth convolution operation on the spatial feature;

generating a first intermediate result by performing a third self-attention operation that uses a result of the eighth convolution operation as a third self-attention query, uses a result of the ninth convolution operation as a third self-attention key, and uses a result of the tenth convolution operation as a third self-attention value;

generating a second intermediate result by performing a fourth self-attention operation that uses the result of the eighth convolution operation as a fourth self-attention query, uses a result of the eleventh convolution operation as a fourth self-attention key, and uses a result of the twelfth convolution operation as a fourth self-attention value; and generating the spatio-temporal feature by adding the first intermediate result to the second intermediate result.

9. The method of claim 1, further comprising determining whether the first input image and the second input image are included in the scene based on at least one of meta information about the video or a change in a frame of the video.

10. A non-transitory computer-readable recording medium configured to store one or more instructions which, when executed by at least one processor of a device for processing a video, causes the device to:

extract a first image feature from a first input image included in a scene;

extract a second image feature from a second input image, wherein the second input image is included in the scene, wherein the second input image is a target frame;

generate, based on the first image feature and the second image feature, a temporal feature associated with information about a temporal change between the first image feature and the second image feature; and generate an output image based on the temporal feature, wherein to generate the temporal feature, the one or more instructions further cause the device to:

perform a first convolution operation on the first image feature and performing a second convolution operation on the second image feature;

generate an offset image feature based on a result of the first convolution operation and a result of the second convolution operation using an offset network configured to learn an amount of movement between pixels in the first image feature and pixels in the second image feature;

perform a third convolution operation on the offset image feature;

perform a fourth convolution operation on the offset image feature; and generate the temporal feature by performing a self-attention operation that uses the result of the second convolution operation as a self-attention query, uses a result of the third convolution operation as a self-attention key, and uses a result of the fourth convolution operation as a self-attention value.

11. The non-transitory computer-readable recording medium of claim 10, wherein to generate the offset image feature, the one or more instructions further cause the device to:

generate a first offset from the result of the first convolution operation using a first offset network;

generate a second offset from the result of the second convolution operation using a second offset network; and generate the offset image feature by adding, to the first image feature, a third offset obtained by subtracting the first offset from the second offset.

12. An apparatus for processing a video, the apparatus comprising:

at least one processor; and a memory configured to store one or more instructions which, when executed by the at least one processor, cause the apparatus to perform operations comprising:

extracting a first image feature from a first input image included in a scene, extracting a second image feature from a second input image included in the scene, wherein the second input image is a target image, generating, based on the first image feature and the second image feature, a temporal feature associated with information about a temporal change between the first image feature and the second image feature, and generating an output image based on the temporal feature, wherein the generating of the temporal feature comprises:

performing a first convolution operation on the first image feature and performing a second convolution operation on the second image feature;

generating an offset image feature, based on a result of the first convolution operation and a result of the second convolution operation using an offset network configured to learn an amount of movement between pixels in the first image feature and pixels in the second image feature;

performing a third convolution operation on the offset image feature;

performing a fourth convolution operation on the offset image feature; and generating the temporal feature by performing a first self-attention operation that uses the result of the second convolution operation as a first self-attention query, uses a result of the third convolution operation as first self-attention key, and uses a result of the fourth convolution operation as a first self-attention value.

13. The apparatus of claim 12, wherein the generating the offset image feature comprises:

generating a first offset from the result of the first convolution operation by using a first offset network;

generating a second offset from the result of the second convolution operation by using a second offset network; and generating the offset image feature by adding, to the first image feature, a third offset obtained by subtracting the first offset from the second offset to the first image feature.

14. The apparatus of claim 13, wherein the offset network comprises:

a depthwise convolution layer, a Gaussian error linear unit (GELU) activation function, and a pointwise convolution layer.

15. The apparatus of claim 12, wherein the extracting of the first image feature comprises extracting the first image feature using a first convolution layer, and wherein the extracting of the second image feature comprises extracting the second image feature using a second convolution layer.

16. The apparatus of claim 12, wherein the operations further comprise generating a spatial feature for the second input image, based on the second image feature and a third image feature, wherein the output image is generated further based on the spatial feature, and wherein the third image feature is an output of a k−1-th layer in a second convolutional neural network, where k denotes a number of layers included in the second convolutional neural network.

17. The apparatus of claim 16, wherein the generating the spatial feature comprises:

performing a fifth convolution operation on the second image feature, performing a sixth convolution operation on the third image feature, performing a seventh convolution operation on the third image feature, and generating the spatial feature by performing a second self-attention operation that uses a result of the fifth convolution operation as a second self-attention query, uses a result of the sixth convolution operation as a second self-attention key, and uses a result of the seventh convolution operation as a second self-attention value.

18. The apparatus of claim 17, wherein the operations further comprise:

extracting a fourth image feature from a matrix comprising the first input image and the second input image stacked in a channel direction; and generating a spatio-temporal feature for the first input image and the second input image, based on the fourth image feature, the temporal feature, and the spatial feature, wherein the output image is further generated based on the spatio-temporal feature.

19. The apparatus of claim 18, wherein the generating the spatio-temporal feature comprises:

performing an eighth convolution operation on the fourth image feature, performing a ninth convolution operation on the temporal feature, performing a tenth convolution operation on the temporal feature, performing an eleventh convolution operation on the spatial feature, performing a twelfth convolution operation on the spatial feature, generating a first intermediate result by performing a third self-attention operation that uses a result of the eighth convolution operation as a third self-attention query, uses a result of the ninth convolution operation as a third self-attention key, and uses a result of the tenth convolution operation as a third self-attention value, generating a second intermediate result by performing a fourth self-attention operation that uses the result of the eighth convolution operation as a fourth self-attention query, uses a result of the eleventh convolution operation as a fourth self-attention key, and a uses result of the twelfth convolution operation as a fourth self-attention value, and generating the spatio-temporal feature by adding the first intermediate result to the second intermediate result.

20. The apparatus of claim 12, wherein the operations further comprise determining whether the first input image and the second input image are included in the scene, based on at least one from among meta information about the video and a change in a frame of the video.

21. The method of claim 1, wherein the generating the offset image feature comprises:

generating a first offset based on the result of the first convolution operation;

generating a second offset based on the result of the second convolution operation; and generating the offset image feature by adding, to the first image feature, a third offset obtained by subtracting the first offset from the second offset.

* * * * *